T. J. DUDLEY AND M. H. BRYANT.
DRAFT EQUALIZER.
APPLICATION FILED FEB. 20, 1918.
1,317,867.
Patented Oct. 7, 1919.
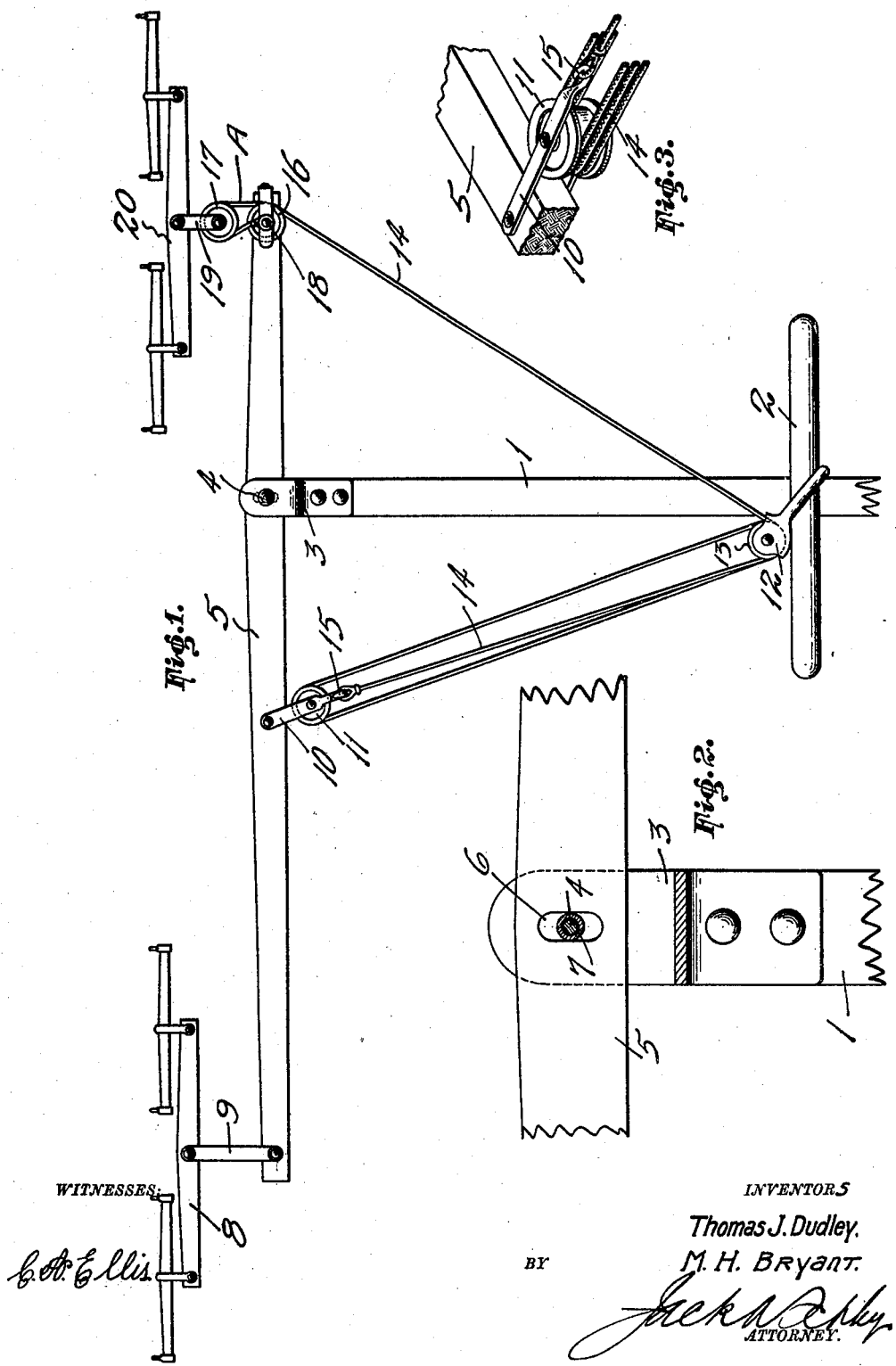
INVENTORS
Thomas J. Dudley.
M. H. Bryant.

UNITED STATES PATENT OFFICE.

THOMAS J. DUDLEY, OF DALLAS, TEXAS, AND MARVIN H. BRYANT, OF BOSWELL, OKLAHOMA; SAID BRYANT ASSIGNOR TO SAID DUDLEY.

DRAFT-EQUALIZER.

1,317,867.      Specification of Letters Patent.      Patented Oct. 7, 1919.

Application filed February 20, 1918. Serial No. 218,211.

*To all whom it may concern:*

Be it known that we, THOMAS J. DUDLEY and MARVIN H. BRYANT, citizens of the United States, residing at Dallas and Boswell, respectively, in the counties of Dallas and Choctaw and States of Texas and Oklahoma, have invented certain new and useful Improvements in Draft-Equalizers, of which the following is a specification.

This invention relates to new and useful improvements in draft equalizers.

In carrying out the invention an evener bar is connected with a relatively fixed point by means of a block and tackle which is offset on the evener from the pivot point of the latter. The flexible connection of the block and tackle is passed over a guide point on the evener bar so that the pivot point of the latter is between the point of attachment of the block and tackle and the guide point. The flexible connection has its end fixed to the evener bar adjacent the guide point and is looped over a whiffletree connection, whereby the draft is distributed and compensation had for the swing of the bar which has draft connection at its opposite end. The evener bar has a floating pivot which permits the play of the bar back and forth when a greater portion of the load is thrown on one of the teams and a normal adjustment is thus more quickly and easily obtained. The block and tackle and flexible connection being associated with the bar in the form of a truss with one leg on each side of the pivot point of the evener bar and one team hitched to the end of the evener bar to which the block and tackle is connected and the other team hitched to the flexible connection from the block and tackle, which connection is guided over the other end of the evener bar; it is obvious that any unevenness in the draft is equalized through the block and tackle connection and a free turning movement and swing of the evener bar may be had.

The invention will be more readily understood from a reading of the following specification and by reference to the accompanying drawings, in which an example of the invention is illustrated, and wherein—

Figure 1 is a plan view of an equalizer constructed in accordance with this invention, Fig. 2 is a detail in plan showing the floating or adjustable pivot connection of the evener bar, and Fig. 3 is a detail of one of the block connections.

In the drawings the numeral 1 designates the tongue of an agricultural implement and 2 the axle or other relatively fixed transverse part of the implement. At the end of the tongue a clevis 3 is mounted and provided with the usual bolt 4. An evener bar 5 is mounted in the clevis and is provided with a transverse slot 6. On the bolt 4 a roller-sleeve 7 is disposed within the slot whereby the bar 5 may be bodily moved backward and forward.

The bar 5 has the greater portion of its length projecting on the left hand side of the tongue while a comparatively short portion of its length projects on the right hand side, the normal position of the bar being at substantially right angles to the tongue. At the left hand end of the bar a whiffletree 8 is connected thereto by a pivoted link 9. Adjacent the center of the evener bar a pulley block or connection 10 is pivoted thereto. This block carries a pulley 11, as shown in detail in Fig. 3. Another pulley block or connection 12 is fastened at the intersection of the parts 1 and 2 so as to lie in the angle between said parts on the left hand side of the tongue 1. This block carries a pulley 13. A flexible connection 14 has one end secured to the block 10 at 15 and passes to the pulley 13, around the same back to the pulley 11 and around the same and so on between the pulleys so as to provide several strands. The said connection being led off of the pulley 13 across the tongue to the right hand end of the bar 5.

On the right hand extremity of the bar 5 a guide pulley 16 is mounted and the connection passes over the outer side of the same and around a pulley 17 back to the journal bolt 18 of the pulley 16 to which bolt it is fastened. The connection 14 thus forms a loop A about the pulley 17. The pulley 17 is mounted in the end of a link 19 to the forward end of which a whiffletree 20 is attached. It will be seen that the flexible connection and block and tackle assume the form of a truss the base of which is made by the bar 5.

If the left hand team starts to lag ordinarily the tendency would be for the load to be thrown on the right hand team and the bar 5 swung so that its right hand end projects forward and its left hand end rearward, but in the construction as shown the balance of power would be with the right hand end team by reason of the flexible connection and block and tackle connection whereby the tongue 1 will be kept in line and the whiffletree 8 swung against the team so as to cause them to pick up the load. If the right hand team should lag the compensation had by the block and tackle and flexible connection would adjust the draft. In such cases the slot 6 permits a back and forth movement of the evener bar 5 which gives a compensation and permits a more ready adjustment and equalization. It will be seen that by the flexible connection and block and tackle arrangement that sudden jolts and jars will be more or less absorbed and not transmitted to the collars of the draft animals. It is further pointed out that in turning corners the bar 5 may be swung and the loop A extended so that a short turn may be easily made. The block and tackle arrangement will adjust all irregularities in the draft and the same will be equalized.

The foregoing description and illustration clearly express the invention, but it is to be understood that said illustration is merely an exemplification and the invention may be carried out in various other ways.

What we claim is—

In a draft equalizer, the combination with the draft connection of a vehicle, of a transverse evener bar pivotally attached to said draft connection at a point whereby it is divided into a long portion and a short portion, a draft connection attached to the extremity of the long portion of the evener bar, a pulley block pivoted to the long portion of the evener bar adjacent the center of said bar, a second pulley block connected with a fixed point on the vehicle in rear of the evener bar, a flexible connection having one end secured to one of the pulley blocks and passing between said blocks in several strands, the other end of the flexible connection extending to the extremity of the short portion of the evener bar and formed into a loop, a pulley on the short end of the evener bar over which the looped end of the connection passes, a pulley within the looped end of the connection around which the latter passes and being disposed in front of the evener bar, and a draft connection attached to said last named pulley.

In testimony whereof we affix our signatures.

THOMAS J. DUDLEY.
MARVIN H. BRYANT.

Copies of this patent may be obtained for five cents each, by addressing the "Commissioner of Patents, Washington, D. C."